United States Patent
Kakehi

[11] Patent Number: 5,628,519
[45] Date of Patent: May 13, 1997

[54] OIL SEAL RING OF SYNTHETIC RESIN HAVING ANGULARLY DISPLACED INJECTION POINT

[75] Inventor: Kozo Kakehi, Kuwana-gun, Japan

[73] Assignee: NTN Corporation, Osaka, Japan

[21] Appl. No.: 580,308

[22] Filed: Dec. 28, 1995

[30] Foreign Application Priority Data

Dec. 28, 1994 [JP] Japan .................. 6-327735

[51] Int. Cl.⁶ ........................................ F16J 9/00
[52] U.S. Cl. ............... 277/216; 264/328.9; 264/328.12
[58] Field of Search ............... 277/1, 216; 264/328.9, 264/328.12

[56] References Cited

U.S. PATENT DOCUMENTS

| | | | |
|---|---|---|---|
| 3,906,066 | 9/1975 | Barrie | 264/328.12 |
| 4,432,925 | 2/1984 | Holtzberg et al. | 277/216 |
| 4,542,054 | 9/1985 | Fillmann | 264/328.12 |
| 4,635,944 | 1/1987 | Sabo | 277/216 |
| 4,747,602 | 5/1988 | Kobayashi et al. | 277/216 |
| 5,087,057 | 2/1992 | Kurkowski | 277/216 |
| 5,139,724 | 8/1992 | Hofstetter et al. | 264/328.9 |
| 5,489,631 | 2/1996 | Dubois | 264/328.12 |

FOREIGN PATENT DOCUMENTS 4223709  1/1994  Germany.

*Primary Examiner*—Scott Cummings
*Attorney, Agent, or Firm*—Wenderoth, Lind & Ponack

[57] ABSTRACT

A seal ring having uniform dimensions and uniform composition over the entire length thereof. This is achieved by properly positioning the injection point for injecting a material when injection-molding the seal ring. More specifically, the injection point is angularly displaced from the center of the entire length of the seal ring by ±1° to ±30°.

3 Claims, 5 Drawing Sheets

OIL SEAL RING OF SYNTHETIC RESIN HAVING ANGULARLY DISPLACED INJECTION POINT

BACKGROUND OF THE INVENTION

This invention relates to an oil seal ring of a synthetic resin mainly for use in sealing hydraulic oil in an automatic transmission such as a torque converter or a hydraulic clutch.

Some conventional seal rings of this type are formed from cast iron and others from PTFE (tetrafluoroethylene resin). Some of more recent seal rings are formed by injection-molding a synthetic resin to improve wear resistance and oil sealing properties and to reduce production cost.

Such a seal ring is fitted between a rotary shaft and a cylinder so as to rotate when both members rotate relative to each other and to slide when they move axially relative to each other. It is required to be capable of maintaining sufficient sealing properties even if the rotary shaft and the cylinder runs out or vibrate.

One problem with an oil seal ring formed by injection molding a synthetic resin, especially a large size ring in diameter and circumference, is that if the position of the material injection gate is improper, its dimensions and the composition of material tend to be uneven.

An object of the present invention is to provide an oil seal ring of a synthetic resin having uniform properties over the entire length of the ring by setting the injection point at such a position that dimensions of the ring and its material composition will be uniform.

Another object of the invention is to provide a mold for injection molding the abovementioned oil seal ring of a synthetic resin.

SUMMARY OF THE INVENTION

The invention provides, an oil seal ring of a synthetic resin having two separate, opposite ends and formed by injection-molding a synthetic resin, the seal ring having an injection point for injecting a material disposed at substantially the center of the entire length of the seal ring.

With this arrangement, the lengths of the portions of the seal ring between the injection point and both ends of the seal ring are substantially equal to each other, so that it is possible to form a seal ring with uniform dimensions and composition over the entire length thereof. Such a seal ring has sufficient strength, so that it will never be chipped or worn under high oil pressure and/or torque. Also, it will exhibit high sealing capability even if it vibrates or whirls.

According to the invention, the injection point is disposed at a position displaced about ±30 degrees from the center of the entire length of the seal ring. With this arrangement, stress concentration at the injection point can be avoided when the seal ring is forcibly spread at its separated portion to mount it in a seal groove of the mating member.

According to the invention, a mold for injection-molding an oil seal ring of a synthetic resin is provided, the mold having a cavity for molding the oil seal ring having two separate, opposite ends, the mold further having a gate for injecting a material for the seal ring disposed at substantially the center of the entire length of the cavity. The mold can be used to form the seal ring of the invention.

According to the invention, the gate is preferably disposed at a position displaced about ±30 degrees from the center of the entire length of the cavity.

Other features and objects of the present invention will become apparent from the following description made with reference to the accompanying drawings, in which:

DETAILED DESCRIPTION OF THE PREFERRED EMBODIMENT

Figure 1A:
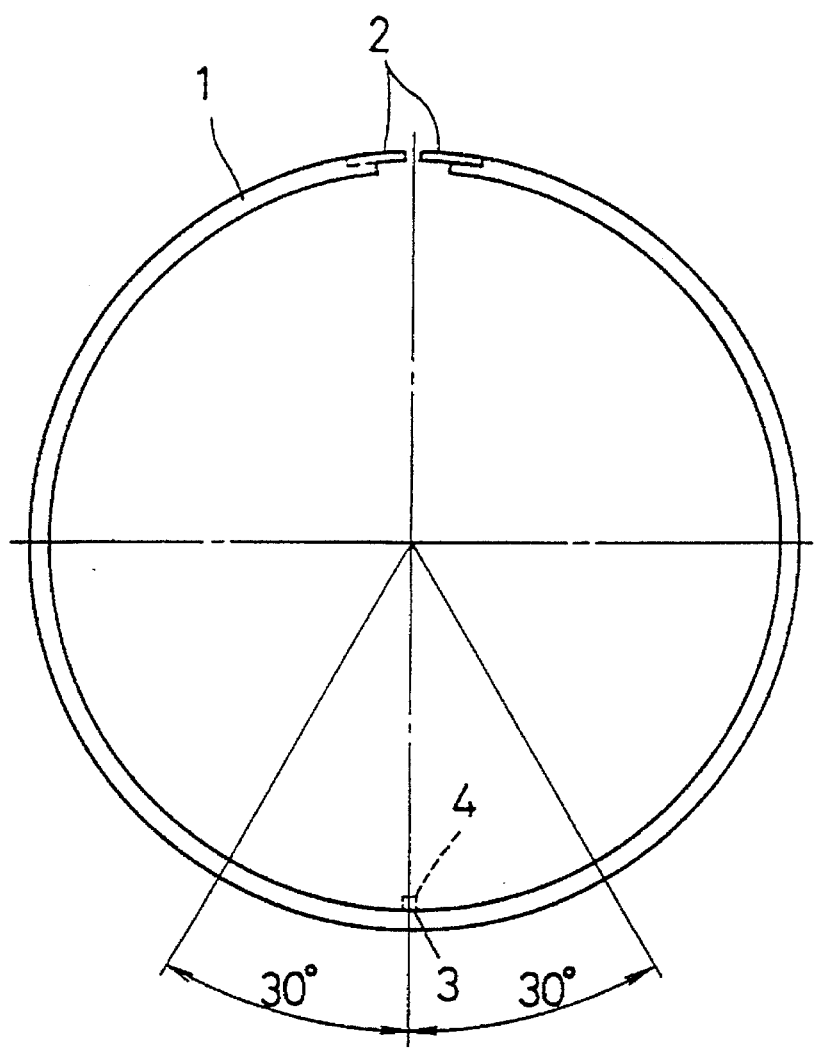
FIG. 1A is a plan view of a first embodiment.
Figure 1B:
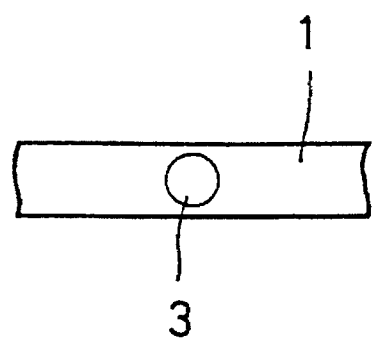
FIG. 1B is a partial enlarged front view of a second embodiment.

Referring to FIGS. 1A and 1B, the oil seal ring 1 of the first embodiment has two separate, opposite ends or abutments 2. The seal ring is injection-molded with the abutments slightly separated from each other. After injection molding, the ends or abutments 2 are butted and heated so that both ends contact each other. When setting this seal ring in a sealing groove formed in a mating member, the abutments 2 are spread apart.

An injection point 3 through which the material is poured is provided substantially in the longitudinal center of the seal ring 1. This point can be found easily because a mark of a gate 4 is left at this point after injection-molding the ring 1.

This seal ring 1 has an outer diameter of 70 mm, so that its circumferential length is about 220 mm. The term "substantially in the longitudinal center" refers to an angular range of ±30 from the center (FIG. 1A).

Description is now made of the method of manufacturing the seal ring and the results of evaluation.

The seal ring 1 is formed from a raw material comprising, as a main component, not less than 50% polyetherether ketone resin (PEEK), which is a kind of polyether ketone resin known for its excellent heat resistance and mechanical strength, and as additional fillers, 5–25% by weight of pitch carbon fiber (CF) having an average fiber diameter of about 5–20 μm and an average fiber length of about 10–500 μm, with suitable strength, modulus of elasticity and hardness, and 5–25% by weight of solid lubricants such as a polytetrafluoroethylene (PTFE) having good sliding and releasing properties and having an average particle diameter of about 1–100 μm, preferably 10–70 μm, talc, mica, calcium carbonate, molybdenum disulfide, or tungsten disulfide to get a better distribution.

Figure 4:
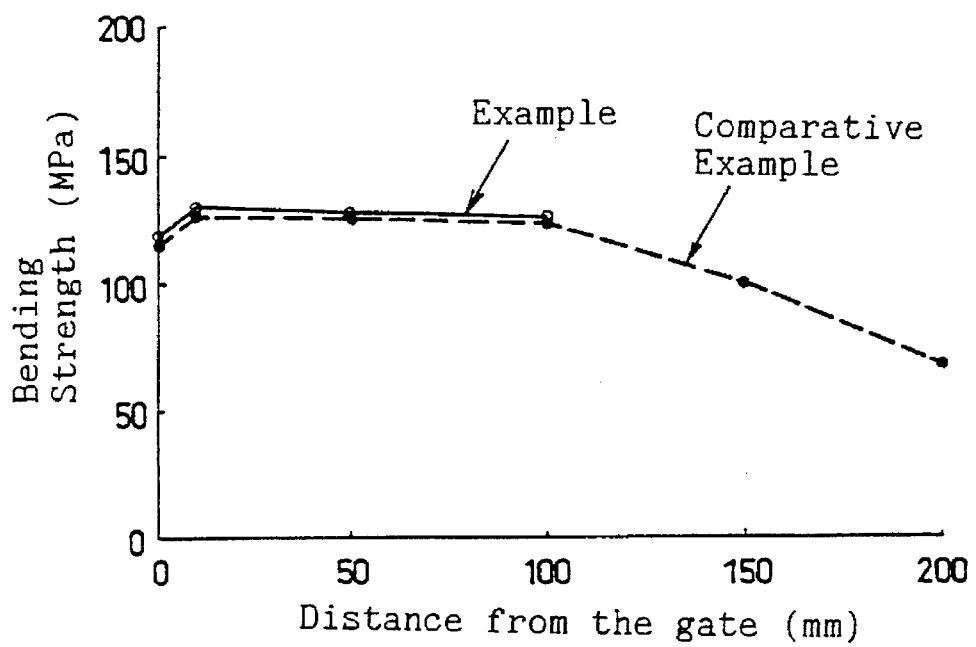
FIG. 4 is a graph showing the results of a bending strength test.
Figure 5:
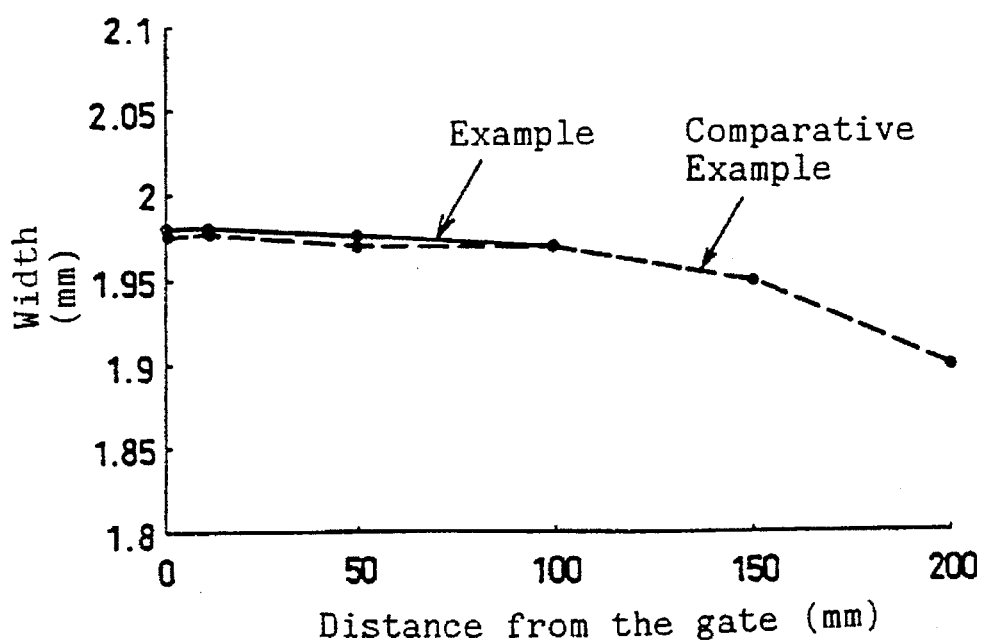
FIG. 5 is a graph showing the results of measurement of width change.

This raw material was injection-molded into a seal ring having a substantially square (2 mm wide×2 mm thick) cross-section with a 70-mm outer diameter. After heat-treating this ring at 180°–280° C., its dimensions were measured and its bending strength was tested. The results are shown in FIGS. 4 and 5.

The following materials were used in the Example:
PEEK (VICTREX-PEEK150P by I.C.I in England) 50% by weight
CF (KUREHA M207S by Kureha Chemical, average fiber dia.: 14.5 μm) 20% by weight
PTFE (300H by Kitamura) 10% by weight
talc (Crown talc by Matsumura Sangyo, average particle dia.: 11 μm) 20% by weight
Other synthetic resins which may be used in this example include polyphenylene sulfide resin (PPS) and thermoplastic polyimide resin (TPI).

Measurements were made on various physical properties of the molding formed mainly from PEEK used in the Example. The results are shown below:

melting point: 330°–340° C.
thermal deformation temperature: 270°–290° C. (ASTM D-648 (1.81 MPa))
glass transition point: 140°–150° C.
bending strength: 120–130 MPa (ASTM D-790)
bending modulus: 9000–10000 MPa (ASTM D-90)
hardness (Rockwell hardness): M75-M80 (ASTM D-785)
Test methods are shown in the brackets.

Preferably, the molding having the above composition has a melting point of about 280°–480° C., a thermal deformation temperature of 230°–430° C. under ASTM D-648 (1.81 MPa), a bending strength of 100–300 MPa, preferably 110–140 MPa, under ASTM D-790, a bending modulus of 2000–20000 MPa, preferably 4000–20000 MPa under ASTM D-790, and a hardness of M70-120 under ASTM D-785 (Rockwell hardness, scale M).

A seal ring having a melting point and a thermal deformation temperature within the abovementioned ranges will maintain sufficiently high heat resistance even if it is heated by frictional contact with the mating member such as a piston or a cylinder of a hydraulic clutch with the oil temperature increasing to a high level of e.g. about 80°–180° C. while the hydraulic clutch is operated. Also, a seal ring having the structure defined in the present invention and having a bending strength and a bending modulus within the abovementioned ranges is less likely to damage or chip. A seal ring having a surface hardness within the abovementioned range will maintain good mechanical properties including creep resistance for a long time even if the oil pressure in a hydraulic clutch rises to e.g. about 0.5–2.5 MPa during operation of the clutch, so that the seal ring is pressed against the piston or the cylinder of the clutch.

Heat treatment such as annealing should be carried out at a temperature higher than the glass transition temperature of a tacky heat-resistant resin but lower than the melting point of the molding material. More specifically, such heat treatment should be carried out at a temperature higher than the glass transition temperature and a temperature higher than the thermal deformation temperature by about 5°–40° C., preferably by about 10°–30° C., more preferably by about 10°–20° C.

If the heat treatment temperature is lower than the glass transition temperature, crystallization will not occur or it will take an unduly long time for crystallization to occur. It is also difficult to eliminate any slight strain in the molded product. Good dimensional stability is also hard to come by. If the heat treatment temperature is higher than the melting point or the above-defined temperature range, the tacky heat-resistant resin will melt or markedly soften, making it extremely difficult to mold the material into the shape of a seal ring. It will be also difficult to maintain high dimensional accuracy.

For better sliding and release properties, the roughness of the sliding surface of the seal ring and of the mating mold should be about 0.1–25 μm, preferably about 0.1–10 μm, as measured in maximum roughness (Rmax), arithmetic average roughness (Ra) or ten-point average roughness (Rz).

Figure 2:
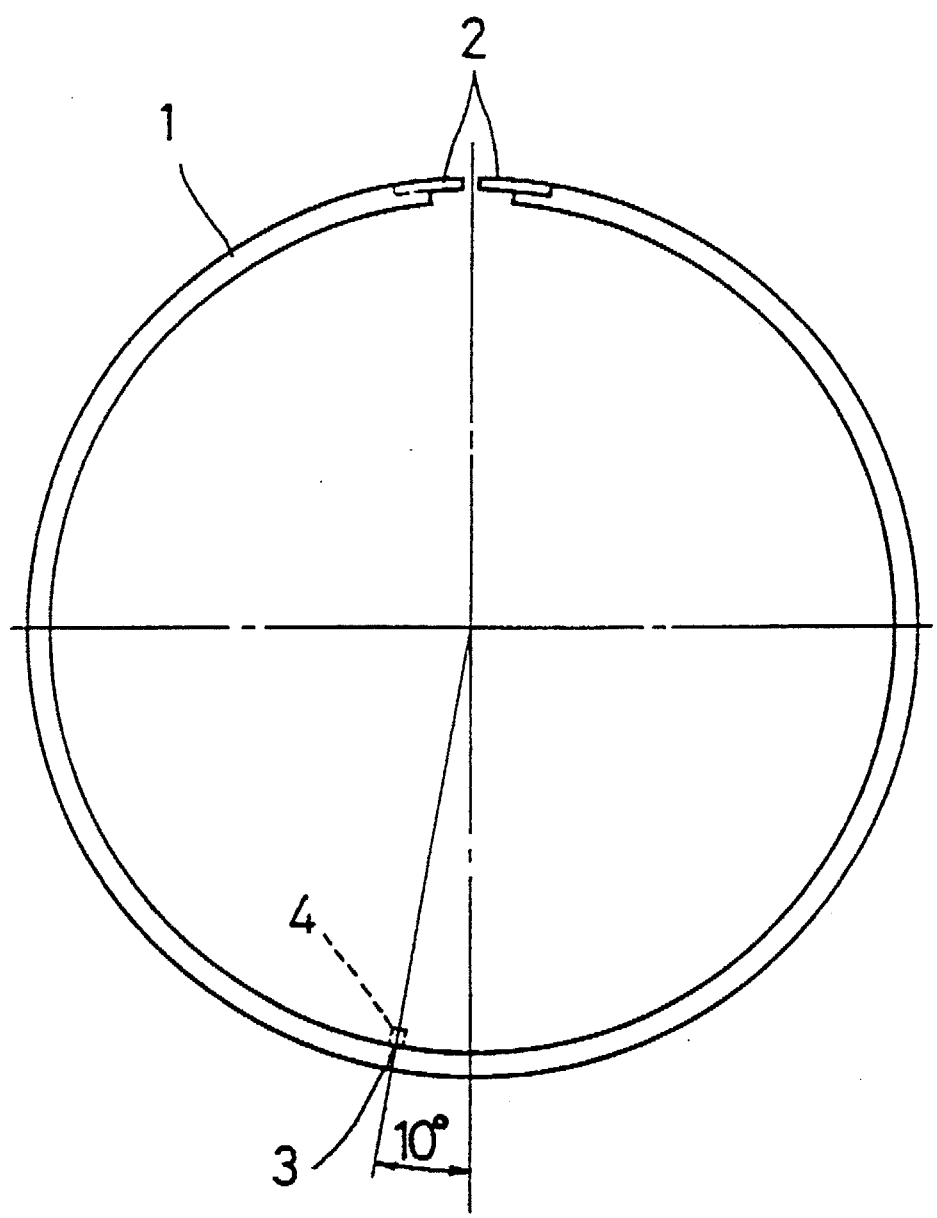
FIG. 2 is a plan view of the second embodiment.

FIG. 2 shows the second embodiment. In this embodiment, the material injection point 3 is displaced slightly (about ±10°) from the longitudinal center. The composition of the material and its dimensions are the same as the first embodiment.

Since stresses tend to concentrate on the longitudinal center of the ring when mounting the seal ring in a sealing groove of a mating member, it is possible to avoid stress concentration on the injection point 3, because it is provided slightly displaced from the longitudinal center.

In order to avoid stress concentration, the material injection point or gate should not be provided within the range of ±1 from the longitudinal center of the seal ring. For this purpose, it should rather be provided within the range of from about ±1° to ±30°, preferably from about ±3° to ±30°, more preferably from about ±10° to ±30°, from the longitudinal center of the seal ring. Also, only one material injection point or gate should be provided in order to minimize the weld point which can weaken the mechanical strength of the entire seal ring.

(Comparative Example)

Figure 3:
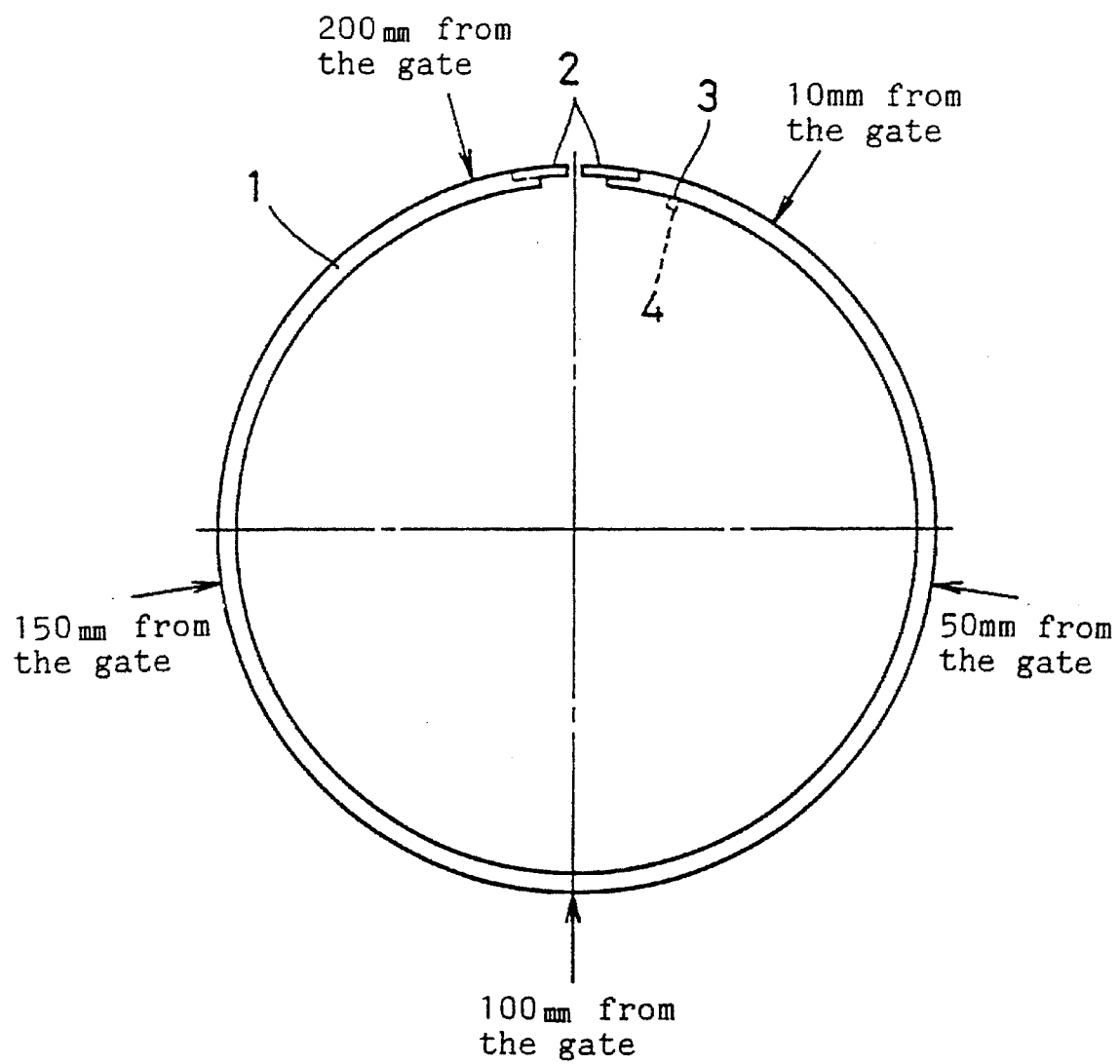
FIG. 3 is a plan view of a comparative example.

A seal ring of the same composition, dimensions and shape as the seal ring of the first embodiment was formed by injection-molding with the injection point 3 set near one of the abutments 2 (FIG. 3). Dimensions of the seal ring thus formed were measured and its bending stress was tested. The results obtained are shown in FIGS. 4 and 5.

From these results, one can see that at the portion of the seal ring that is separated more than 150 mm from the injection point, the bending strength decreases and the width between the side faces of the seal ring reduces. Such a width is reduced both in the Example of the invention and Comparative Example. This is because both sides of the seal ring are machined with high accuracy to provide side faces having accurate surface shape and surface roughness.

The bending strength near the injection point is seen to be relatively low, but not so low as to cause any functional problem.

Figure 6:
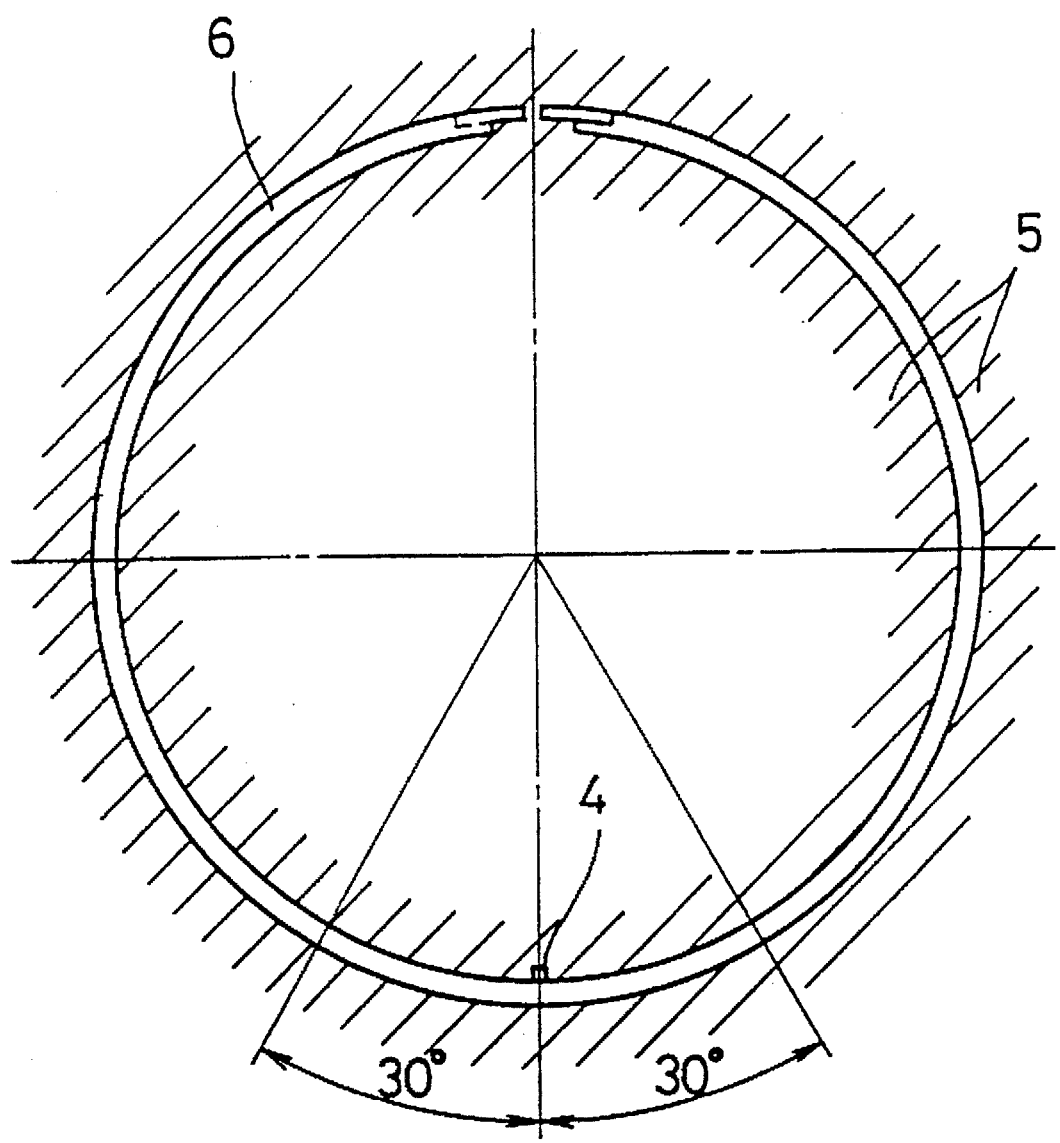
FIG. 6 is a partial plan view in cross-section of an embodiment of an injection-molding device.

FIG. 6 shows a part of a mold 5 for injection molding. It has a cavity 6 in which the seal ring 1 is injection-molded. A gate 4 is provided at substantially the center of the entire length of the cavity.

More specifically, the gate 4 is provided in an angular range of ±30°, preferably at a position displaced ±10 degrees, from the center of the entire length of the cavity. This mold 5 is used to injection-mold the seal rings of the first and second embodiments.

Among several abutment shapes currently used widely, step-cut abutments can reduce oil leakage. When injection-molding a seal-ring having such step-cut abutments in the mold shown in FIG. 6, the abutments are separated from each other by a distance equal to the length of the sealing protrusions of the step-cut abutments. With this arrangement, it is possible to prevent stress concentration on the longitudinal center of the seal ring when heat-bonding the abutments or when mounting the seal ring on a piston or a cylinder. Step-cut abutments or more complicated abutment shape having steps in both radial and axial directions can be formed easily by injection molding.

What is claimed is:

1. An oil seal ring of a synthetic resin having two separate, opposite ends and formed by injection-molding a synthetic resin, said seal ring having an injection point for injecting a material located at a position angularly displaced by ±1° to ±30° from the center of the entire length of said seal ring.

2. An oil seal ring as claimed in claim 1 wherein said injection point is located at a position angularly displaced by ±3° to ±30° from the center of the entire length of said seal ring.

3. An oil seal ring as claimed in claim 1 wherein said injection point is located at a position angularly displaced by ±10° to ±30° from the center of the entire length of said seal ring.

* * * * *